Nov. 17, 1959     R. C. BEACHAM ET AL     2,912,980
BLOOD STRAINER
Filed June 13, 1956     2 Sheets-Sheet 1
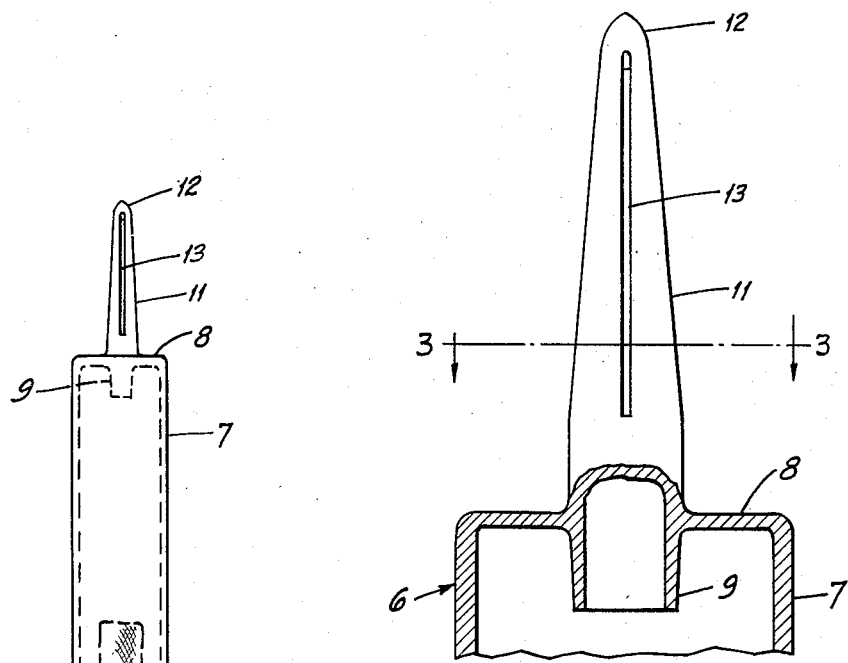
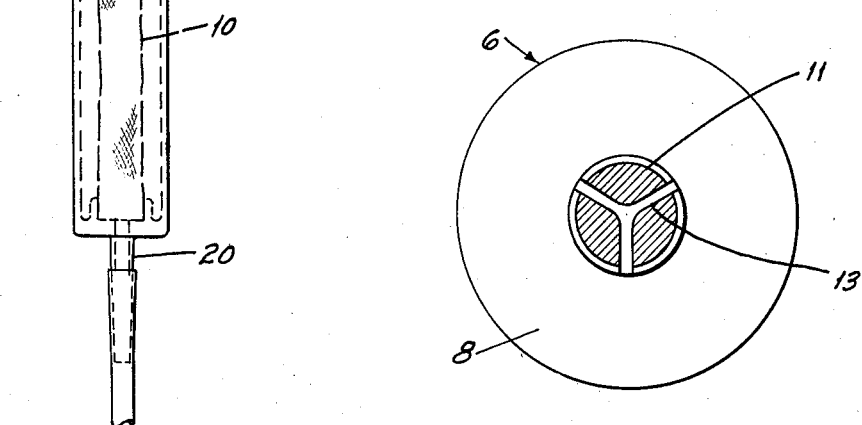
INVENTORS
Robert C. Beacham
William F. Butler
ECKHOFF & SLICK
ATTORNEYS
BY Robert H. Eckhoff
A MEMBER OF THE FIRM INVENTORS
Robert C. Beacham
William F. Butler
ECKHOFF & SLICK
ATTORNEYS United States Patent Office 2,912,980
Patented Nov. 17, 1959

2,912,980

BLOOD STRAINER

Robert C. Beacham, Richmond, and William F. Butler, Oakland, Calif., assignors to Cutter Laboratories, Inc., a corporation of California Application June 13, 1956, Serial No. 591,513

7 Claims. (Cl. 128—214)

This is a continuation-in-part of application Serial No. 503,636, filed April 25, 1955.

This invention relates to blood strainers and drip meters suitable for use in making blood transfusions.

Blood transfusions are presently administered in either of two ways: by the so-called direct method in which the blood is passed directly from the donor to the patient, and by the presently more generally utilized indirect method, in which the blood of a donor is stored until ready for use in a flask containing an anti-coagulant solution. It has been observed that irrespective of the use of an anti-coagulant, some blood slime and small blood clots persist in forming. Since the introduction into a vein of a solid particle larger than a predetermined size cannot be tolerated, efforts have been made ever since the introduction of the indirect method to strain out such solid particles. In the past, these efforts have usually included the use of various complicated strainers or filters; these have not been completely satisfactory since they have generally included filter elements of such fine size that the collection on their surface of a few clots of large size materially reduce the rate of flow of blood.

In accordance with this invention, we provide a blood strainer to be inserted into the flask containing the blood and anti-coagulant solution and which is so fabricated that it provides an initial sizing of any particle in the fluid permitted to pass from the flask so that passage to the filter of large particles, e.g. clots, is prevented. By utilizing such a device, a high flow rate through the filter can be maintained throughout the transfusion.

It is in general the broad object of the present invention to provide a device for sizing particles in whole blood to the end that those particles larger than a desired size are retained in the blood supply and do not pass to the supplementary filter so that the fluid capacity of the supplementary filter is maintained at a high rate of flow.

A further object of the present invention is to provide a novel construction for a device to be utilized to withdraw blood from a flask. Such a device is commonly known as a drip meter, and a further object of the present invention is to provide a novel drip meter construction.

The invention includes other objects and features of advantage, some of which, together with the foregoing, will appear hereinafter wherein the present preferred form of blood strainer and drip meter of this invention is disclosed.

In the drawing accompanying and forming a part hereof, Figure 1 is a side elevation of a blood strainer and filter embodying the present invention.

Figure 2 is an enlarged fragmentary view of the blood strainer shown in Figure 1.

Figure 3 is a section taken along the line 3—3 in Figure 2.

Figure 4:
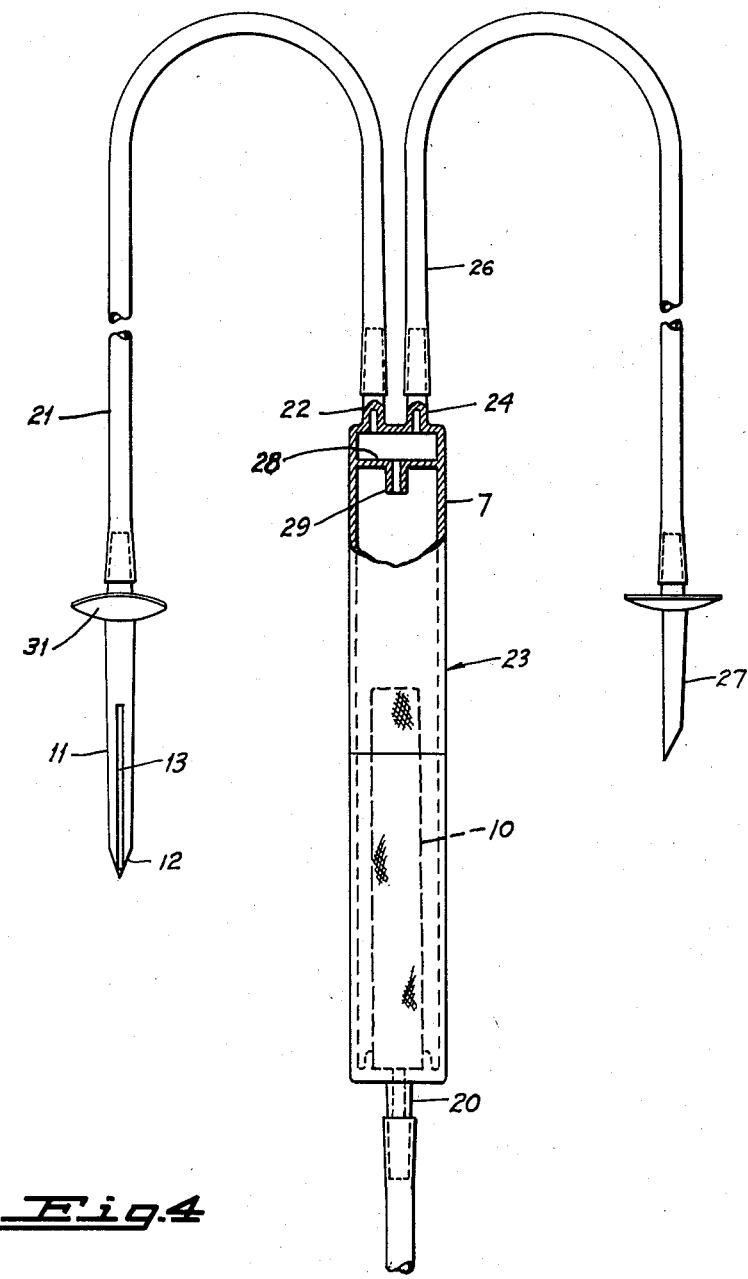
Figure 4 is a side elevation of another form of drip meter and blood strainer embodying the present invention.

Referring to the drawing in Figures 1, 2 and 3, we have indicated generally at 6 a drip meter having a cylindrical side wall 7, an end 8 from which depends a cylindrical portion 9 provided as a continuation of a forwardly extending hollow piercing element or spike 11. Portion 9 serves to collect fluid passing from the spike and serves as a visual metering device. The drip meter 6 usually contains one or more suitable supplementary filtering elements 10 for filtering fluid passing to the outlet 20. Spike 11 is generally conical in shape and terminates in a relatively sharp closed end 12.

In accordance with this invention, the spike 11 is provided with one or more narrow slots 13, extending longitudinally thereof from adjacent end 12 to adjacent end 8, and providing for fluid flow from the container in which the spike is positioned. In the form of device shown, three slots 13 have been provided 120° apart.

Further and in accordance with this invention, the interior of the spike is so formed as to provide longitudinal support for the spike during the operation in which the spike is forced through the usual rubber stopper provided in the blood flask. Spike 11 can be formed with a generally cylindrical hollow interior with the side walls of the spike relatively thin in extent. We have found, however, that while such a spike can be inserted satisfactorily into the rubber stopper in the flask, nonetheless, it is desirable to provide additional columnar support and, to this end, the slots 13 are preferably formed as is shown in Figure 2 wherein each of the slots is carried inwardly to a junction with at least one of the other slots. This provides longitudinal or columnar support for the spike in that when the spike is forced into a stopper, the boundary areas defining the slots quickly come into abutment and the slots are in collapsed position. However, the spike can then be forced through the resilient flask closure quite readily since it has then become a rigid column. When the spike is in position, the slots expand and permit fluid to flow therethrough into the interior of the spike.

While in that form of the invention disclosed in Figures 1, 2 and 3, the spike 11 has been shown as formed integral with the end of the blood strainer and drip meter 6, this is not essential for the novel spike of this invention can be used to advantage in other ways. For example, referring particularly to Figure 4, the spike 11 is shown as projecting from the drip meter and strainer structure, generally indicated at 23, and to which it is attached to a flexible tube 21, the latter being connected to an inlet 22 on the drip meter. A second inlet 24 is also provided upon the drip meter 23, connected by a flexible tube 26 to an ordinary form of tubular spike 27. Within the drip meter 23 and spaced slightly from the inlet end thereof is a transverse wall 28, from which depends a tubular element 29 acting as a visual measuring device.

In use, the spike 11 is suitably inserted through a stopper into a bottle containing blood, this insertion being facilitated by the arcuate rim 31 provided about the base of the spike. The other spike 27 is inserted through a stopper into a container filled with some other fluid which it is desired to admix with the blood, the flow of the two fluids being suitably controlled by clamp devices (not shown) applied to the flexible tubings 21 and 26. The two fluids flow into the inlet portion of the drip meter 23 and fall from the tubular element 29 as a mixed fluid. The spike 11 is effective to remove from the blood admitted to the drip meter any clots or coagulated particles which are present in the blood and which might otherwise reduce the capacity of strainer or filter 10.

From the foregoing, we believe it will be apparent that we have provided a relatively novel and simple blood strainer which can be used to advantage as with a drip meter and a filter and the like. The device can be made of any suitable plastic material such as cellulose acetate, cellulose acetate butyrate, a methacrylate polymer, ethyl cellulose and polystyrene.

In the use, the several narrow slots serve to retain any clots or particles of a size which would reduce materially the capacity of the filter element 10. The flow capacity of the slots, however, is greater than that of the filter so that although their free extent is so reduced, the flow rate past the filter element 10 is satisfactory and remains so throughout the transfusion.

We claim:

1. A drip meter and the like having an end from which a solid spike projects, said drip meter end having a fluid passage therein, said solid spike being generally conical in shape and having a relatively sharp terminal end for piercing a flexible closure in a container, said spike having at least one relatively long narrow slot provided in the side wall of such spike and extending intermediate the ends of the spike and providing a fluid passage through the spike to the fluid passage in the drip meter end.

2. A drip meter and the like having an end from which a solid spike projects, said drip meter end having a fluid passage therein, said solid spike being generally conical in shape and having a relatively sharp terminal end for piercing a flexible closure in a container, said spike having at least two relatively long narrow slots in the side wall of such spike and extending intermediate the ends of the spike in communication one with the other to provide a fluid passage through the spike to the fluid passage in the drip meter end.

3. A drip meter and the like having a solid spike projecting at one end thereof, said drip meter end having a fluid passage therein, said solid spike being generally conical in shape and having a relatively sharp terminal end for piercing a flexible closure in a container, said spike having a plurality of relatively long narrow slots provided in the sidewall of such spike and spaced at least 120° apart and extending intermediate the ends of the spike in communication with one another to provide a fluid passage through the spike to the fluid passage in the drip meter end.

4. In a drip meter having a cover at one end and an inlet on said cover providing a drip orifice in the drip meter, the improvement consisting in a solid conical spike mounted on said cover for insertion as into a resilient stopper, said spike extending axially of the drip meter and having at least two narrow slots cut in the sidewall of the spike substantially opposite one another, said slots being in communication with one another and providing a passage through the spike to said inlet and drip orifice.

5. A drip meter and the like having an end to which a solid spike is attached, said drip meter end having a fluid passage therein, said solid spike being generally conical in shape and having a relatively sharp terminal end for piercing a flexible closure in a container, said spike having at least one relatively long narrow slot provided in the side wall of such spike and extending intermediate the ends of the spike and providing a fluid passage through the spike.

6. A drip meter and the like having an end, a solid spike, said drip meter end having a fluid passage therein, a length of flexible tubing connecting said spike to said drip meter end, said solid spike being generally conical in shape and having a relatively sharp terminal end for piercing a flexible closure in a container, said spike having at least one relatively long narrow slot in the side wall of such spike and extending intermediate the ends of the spike to provide a fluid passage through the spike to the flexible tubing.

7. A drip meter and the like having an integral solid spike projecting at one end thereof, said drip meter end having a fluid passage therein, said solid spike being generally conical in shape and having a relatively sharp terminal end for piercing a flexible closure in a container, said spike having at least one relatively long narrow slot provided in the sidewall of such spike and extending intermediate the ends of the spike to provide a fluid passage through the spike to the fluid passage in the drip meter end.

References Cited in the file of this patent

UNITED STATES PATENTS

| | | |
|---|---|---|
| 2,681,654 | Ryan et al. | June 22, 1954 |
| 2,730,097 | Cutter | Jan. 10, 1956 |
| 2,746,455 | Abel | May 22, 1956 |